(12) United States Patent
Pouzols et al.

(10) Patent No.: US 11,549,541 B2
(45) Date of Patent: Jan. 10, 2023

(54) ERGONOMIC FASTENER WITH SNAP-FITTING LEG AND A COMPRESSION COLLAR

(71) Applicant: A. RAYMOND ET CIE, Grenoble (FR)

(72) Inventors: Virginie Pouzols, Huningue (FR); Grégory Paulin, Saint Martin d'Heres (FR); Jimmy Voniez, Grenoble (FR)

(73) Assignee: A. RAYMOND ET CIE, Grenoble (FR)

( * ) Notice: Subject to any disclaimer, the term of this patent is extended or adjusted under 35 U.S.C. 154(b) by 485 days.

(21) Appl. No.: 16/500,067

(22) PCT Filed: Mar. 23, 2018

(86) PCT No.: PCT/FR2018/050709
§ 371 (c)(1),
(2) Date: Oct. 1, 2019

(87) PCT Pub. No.: WO2018/189444
PCT Pub. Date: Oct. 18, 2018

(65) Prior Publication Data
US 2020/0340516 A1    Oct. 29, 2020

(30) Foreign Application Priority Data

Apr. 10, 2017   (FR) .................................... 1753124

(51) Int. Cl.
*F16B 21/08*   (2006.01)
*F16B 5/06*    (2006.01)

(52) U.S. Cl.
CPC ............ *F16B 21/086* (2013.01); *F16B 5/065* (2013.01); *F16B 5/0664* (2013.01)

(58) Field of Classification Search
CPC ...... F16B 21/086; F16B 5/065; F16B 5/0664; F16B 5/0657
See application file for complete search history.

(56) References Cited

U.S. PATENT DOCUMENTS 4,920,618 A * 5/1990 Iguchi ................... F16B 13/061
                                                    24/297
5,173,026 A * 12/1992 Cordola .................. F16B 5/065
                                                    24/297

(Continued)

FOREIGN PATENT DOCUMENTS

DE    29708112 U1    9/1997
DE     4404746 C2    8/1999

(Continued)

OTHER PUBLICATIONS

International Search Report for International Application No. PCT/FR2018/050709 dated Jun. 14, 2018, 3 pages.

(Continued)

*Primary Examiner* — David M Upchurch
(74) *Attorney, Agent, or Firm* — TraskBritt

(57) ABSTRACT

A fastener for attaching an element to a support includes a fastening base intended to pass through an opening provided in the support by ways of an axial compression force, a head, and a frustoconical and elastically deformable compression collar. The collar, when compressed, is intended to bear against the support. The collar is connected to the head in a connection region. The compression collar has a first bending region, and at least a second bending region, the first and the second bending regions being configured to deform in a predetermined manner when the fastener is subjected to the axial compression force.

12 Claims, 3 Drawing Sheets

(56) References Cited

U.S. PATENT DOCUMENTS

| | | | |
|---|---|---|---|
| 5,647,713 A | 7/1997 | Ge et al. | |
| 5,857,244 A | 1/1999 | Edwards et al. | |
| 2013/0164099 A1* | 6/2013 | Rosemann | F16B 21/086 |
| | | | 411/508 |
| 2013/0199004 A1* | 8/2013 | Kirchen | F16B 13/02 |
| | | | 24/595.1 |
| 2018/0291942 A1* | 10/2018 | Shinoda | F16B 5/0621 |

FOREIGN PATENT DOCUMENTS

| | | |
|---|---|---|
| EP | 0735285 B1 | 5/2000 |
| EP | 1403534 B1 | 11/2006 |
| EP | 1895171 A3 | 3/2015 |
| FR | 1183128 A | 7/1959 |
| FR | 1574874 A | 7/1969 |
| FR | 2944569 B1 | 4/2011 |
| FR | 2938310 B1 | 5/2013 |
| GB | 2424461 B1 | 9/2007 |
| WO | 2012/058215 A1 | 5/2012 |

OTHER PUBLICATIONS

International Written Opinion for International Application No. PCT/FR2018/050709 dated Jun. 14, 2018, 4 pages.

* cited by examiner

ERGONOMIC FASTENER WITH SNAP-FITTING LEG AND A COMPRESSION COLLAR

CROSS-REFERENCE TO RELATED APPLICATIONS

This application is a national phase entry under 35 U.S.C. § 371 of International Patent Application PCT/FR2018/050709, filed Mar. 23, 2018, designating the United States of America and published as International Patent Publication WO 2018/189444 A1 on Oct. 18, 2018, which claims the benefit under Article 8 of the Patent Cooperation Treaty to French Patent Application Serial No. 1753124, filed Apr. 10, 2017.

TECHNICAL FIELD

The present disclosure generally relates to a fastener intended to be attached to a support. The fastener can be used to attach an element to this support.

BACKGROUND

Such fasteners comprising a head that can be used to receive the element to be attached are known, for example, from the documents FR2944569, FR1183128, U.S. Pat. No. 5,647,713, EP0735285, DE29708112 and DE4404746. These fasteners also comprise a snap-fitting leg intended to pass through an opening provided in the support to rigidly hold the fastener therein. The fasteners described in these documents also comprise a frustoconical and elastically deformable compression collar, sometimes also referred to as an "umbrella," connected to the head of the fastener at a connection region, and the concavity of which is directed toward the support. The compression collar makes it possible to eliminate any looseness that may exist in the joint between the snap-fitting leg and the support, which may be related, in particular, to the variability in the thickness of the supports to which the fasteners are to be attached.

The insertion of such a fastener into the opening of the support is enabled by the deformation of the flexible wings of the snap-fitting leg. The insertion causes the peripheral outline of the compression collar to contact the fastener before the flexible wings have completely passed through this support. The axial force applied to the fastener head during the insertion thereof causes the compression collar to bend so that the snap-fitting leg passes through the entire thickness of the fastener and releases the flexible wings. The fastener is then firmly attached to the support, the elastic deformation of the compression collar leading to a forced contact of the snap-fitting leg with one face of the support. The bending of the compression collar is obtained by its progressive crushing or by folding around a bending region located at the connection region.

The deformation of the compression collar during and after the attachment of the fastener depends on the thickness of the support. A relatively small thickness requires only a relatively limited axial displacement of the fastener to allow the flexible wings to engage through the opening in the support. In this case, the compression collar is slightly deformed once the fastener is attached. On the contrary, a relatively thick support requires a larger axial displacement of the fastener to an abutting limit for which the compression collar is in planar contact with the support.

The axial force that is applied to the fastener when it is attached to the support substantially corresponds to the compression or return force of the compression collar. In state-of-the-art fasteners, this compression force is generally increased with the axial displacement of the fastener. When the support is relatively thick, and it is therefore necessary to move the fastener until it is abutting, or close to this position, the high forces that must be applied make the attachment of the fastener uneasy. For example, it may sometimes be necessary to use a tool to allow sufficient force to be applied to enable the flexible wings to engage through the opening of the support.

The present disclosure is intended to remedy all or part of the above-mentioned drawbacks. The main purpose of the present disclosure is to provide an ergonomic fastener that limits the axial forces applied even when it is necessary to move the fastener close to its abutting position. It also aims, in certain embodiments, to provide for a fastener for which the forces applied are substantially constant over a large portion of its travel when it is attached.

BRIEF SUMMARY

With a view to achieving one of these purposes, the subject matter of the present disclosure provides for a fastener for attaching an element to a support, the fastener comprising a fastening base intended to pass through an opening provided in the support by means of an axial compression force, and comprising a head and a frustoconical and elastically deformable compression collar that, when compressed, is intended to bear against the support and is connected to the head in a connection region.

According to the present disclosure, the compression collar has a first peripheral bending region of the collar and at least a second peripheral bending region, the first and second bending regions having a lower thickness than the adjacent collar regions 7a, 7b to make them less rigid and to deform in a preferred manner when the fastener is subjected to the axial compression force.

According to other advantageous and unrestrictive characteristics of the present disclosure, taken alone or in any technically feasible combination:
  the head rests on the top of the compression collar;
  the collar has an outline with a circular cross-section;
  the collar has an outline with a cross-section composed of a plurality of portions;
  the second bending region is located at mid-radius of the collar;
  the first bending region is located at the level of the connection region;
  the fastening base carries an elastic snap-fitting mechanism; and
  the fastening base is a snap-fitting leg comprising a plurality of flexible wings.

BRIEF DESCRIPTION OF THE DRAWINGS

Other characteristics and advantages of the present disclosure will emerge from the detailed description of the present disclosure that follows with reference to the appended figures, wherein.

DETAILED DESCRIPTION

Figure 1:
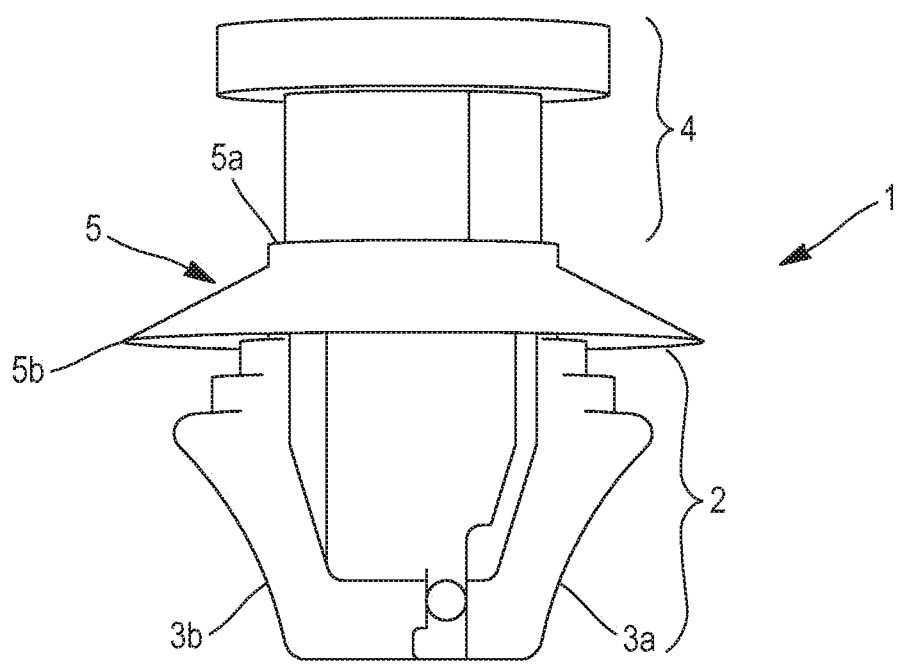
FIG. 1 shows a fastener according to the present disclosure.

FIG. 1 shows a fastener 1 according to the present disclosure. The fastener 1 includes a fastening base in the form in the example shown of a snap-fitting leg 2, comprising two flexible wings, 3a and 3b, which may deform when the fastener 1 is forcefully inserted into, e.g., a cylindrical opening provided in a support, to which the fastener 1 is to be attached. It should be noted that in the example shown in FIG. 1, the flexible wings 3a, 3b have a plurality of stepped notches to facilitate the insertion of the fastener 1 into the support. But the present disclosure is by no means limited to this particular configuration of the fastening base 2. It is generally compatible with any fastening base 2 carrying a mechanism for attaching the fastener 1 to the support, such as an elastic snap-fitting mechanism, but it can also be a "fir tree" base or a "quarter turn" base.

The fastener 1 also has a head 4, which can be the element to be attached, or form a device for attaching this element. The head 4 and the leg 2 define the main axis of the fastener 1.

The fastener 1 also includes a frustoconical and elastically deformable compression collar 5 (and more simply referred to as a "collar" in the following description). The collar 5 is intended to bear, when compressed, against one face of the support in order to place the wings of the snap-fitting leg 2 in forced contact with the opposite face of the support. This eliminates the looseness that may otherwise be exhibited in the elastic snap-fitting mechanism carried by the leg 2 when the fastener 1 is attached to the support.

As can be seen in FIG. 1, the inside of the concavity of the collar 5 is oriented toward the leg 2. The head 4 of the fastener 1 rests on the top of the collar 5. The collar 5 is fixed to the head 4 at a peripheral connection region 5a.

In the example shown in FIG. 1, the outline of a cross section of the collar 5 (i.e., a section in a plane parallel to the support) is circular, and has a full revolution symmetry. But the present disclosure is by no means limited to this configuration and a frustoconical collar 5 with a cross-section of any other shape, whether regular or not, for example, square or rectangular, could be considered. Another option would be a frustoconical collar 5 with incomplete rotational symmetry, and the cross-section of which would be composed of a plurality of portions of a circle, a square or a rectangle.

The fastener 1 is made of, for example, a plastic material, and advantageously in only one piece. It can be formed for example by injection molding.

An axial force applied to the fastener 1, i.e., a force applied along the main axis of the fastener 1, allows the insertion of the fastening base 2 through the opening of the support. The application of force brings the peripheral outer outline 5b of the collar 5 into contact with one side of the support. The axial force, if continuous and sufficient, leads to the bending and compression of the collar 5 to enable the leg 2 to be fully inserted into the opening of the support and to allow the flexible wings 3a, 3b to be deployed on the other side of the support.

The collar 5 includes at least two bending regions 6a, 6b. "Bending region" refers to a peripheral region of the collar 5 around which the collar is likely to bend when resting on the support and an axial compression force is applied to the fastener 1. A bending region is a peripheral region of the collar 5 having a lower stiffness than the other peripheral regions of the collar 5, it is therefore likely to deform in a preferred manner when the fastener 1 is subjected to the axial compression force.

A first bending region 6a can correspond to the connection region 5a connecting the collar 5 to the head 4. The collar 5 is configured to also have at least one second bending region 6b, different from the first region. The first and second bending regions 6a, 6b can be achieved by reducing the thickness of the collar 5 in these regions so as to make it less rigid locally.

Figure 2:
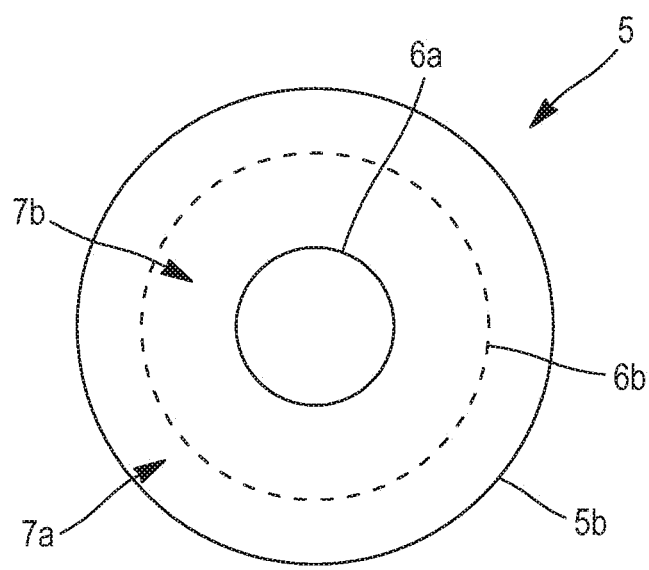
FIG. 2 shows a top view of the collar of the fastener of FIG. 1.

FIG. 2 thus shows a top view of the collar 5 of FIG. 1. In this FIG. 2, the first bending region 6a has been schematically represented at the level of the connection region 5a between the collar 5 and the head 4 of the fastener. The second bending region 6b has also been represented. The second bending region 6b delimits a first peripheral outer region 7a of the collar 5 and a second inner region 7b of the collar 5.

Figure 3A:
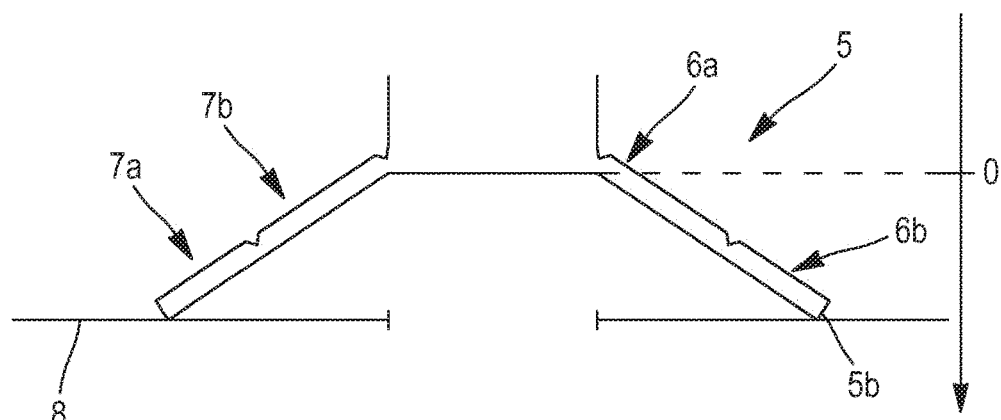
FIGS. 3a to 3c show the operating principle of a fastener according to the present disclosure.
Figure 3B:
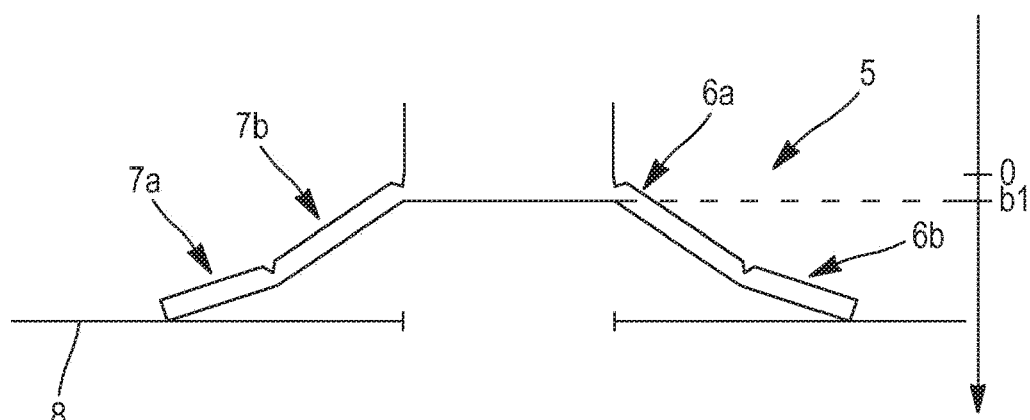
Figure 3C:
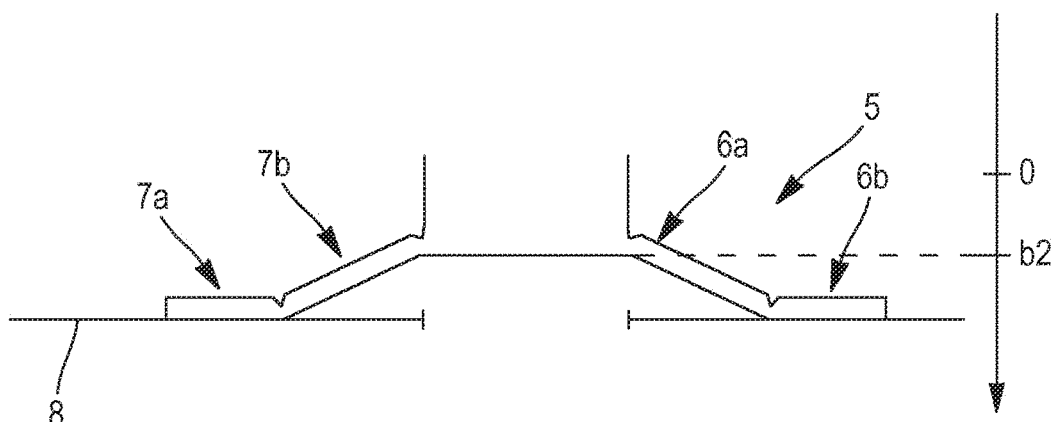

FIGS. 3a to 3c show the operating principle of a fastener 1 according to the present disclosure. For reasons of visibility, the head 4 and the leg 2 of the fastener 1 are not shown in these figures. The first and second bending regions 6a, 6b are symbolically represented by notches, indicating the lower stiffness of the collar 5 in these regions.

FIG. 3a shows the cross-section of the collar 5 when it rests on the support 8 without being deformed at its peripheral outer outline 5b. By convention, this state is assumed to correspond to a zero compression distance and the collar 5 is subjected to an equally zero compression force.

FIG. 3b shows a cross-section of the collar 5 at a first compression distance $h_1$, slightly above zero, at the beginning of the travel of the fastener 1. The bending of the collar 5 is mainly obtained by folding around the second bending region 6b. The lever arm runs between the second bending region 6b and the peripheral outer outline 5b of the collar 5 in contact with the support helps to increase the stiffness of the collar 5 at the beginning of the travel. As the compression distance increases, the peripheral outer region 7a is gradually brought closer to the collar 5 with support 8.

FIG. 3c shows a cross-section of the collar 5 at a second compression distance $h_2$, at the end of the travel of the fastener 1, close to its abutting position on the support 8. The peripheral outer region 7b is in contact with the support 8. The bending of the collar 5 is mainly obtained by folding around the first bending region 6a. This configuration helps to reduce the stiffness at the end of the travel.

Thus, the presence of at least a second bending region 6b on the collar 5 contributes to make the evolution of the compression force with the compression distance uniform between the beginning and the end of the travel.

Figure 4:
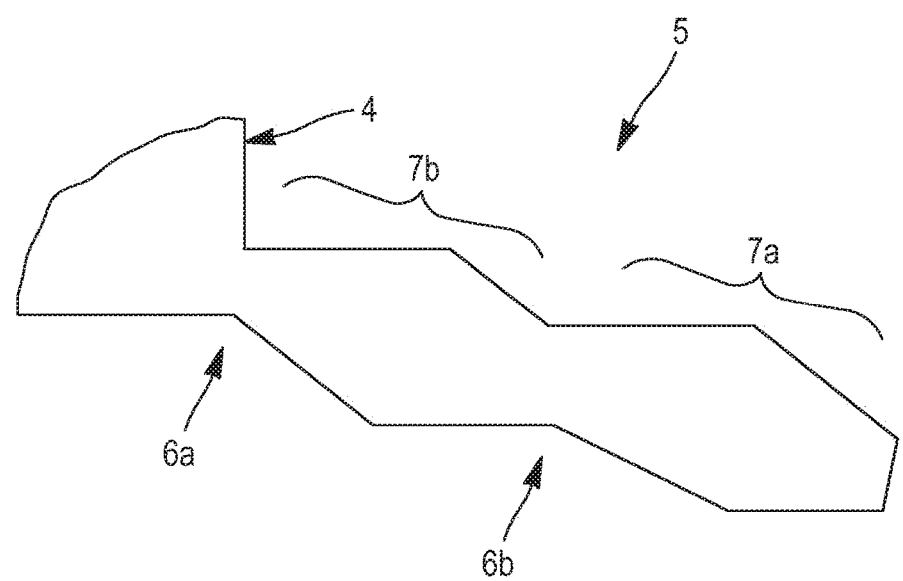
FIG. 4 shows the collar thickness radial profile according to an embodiment of the present disclosure.
Figure 5:
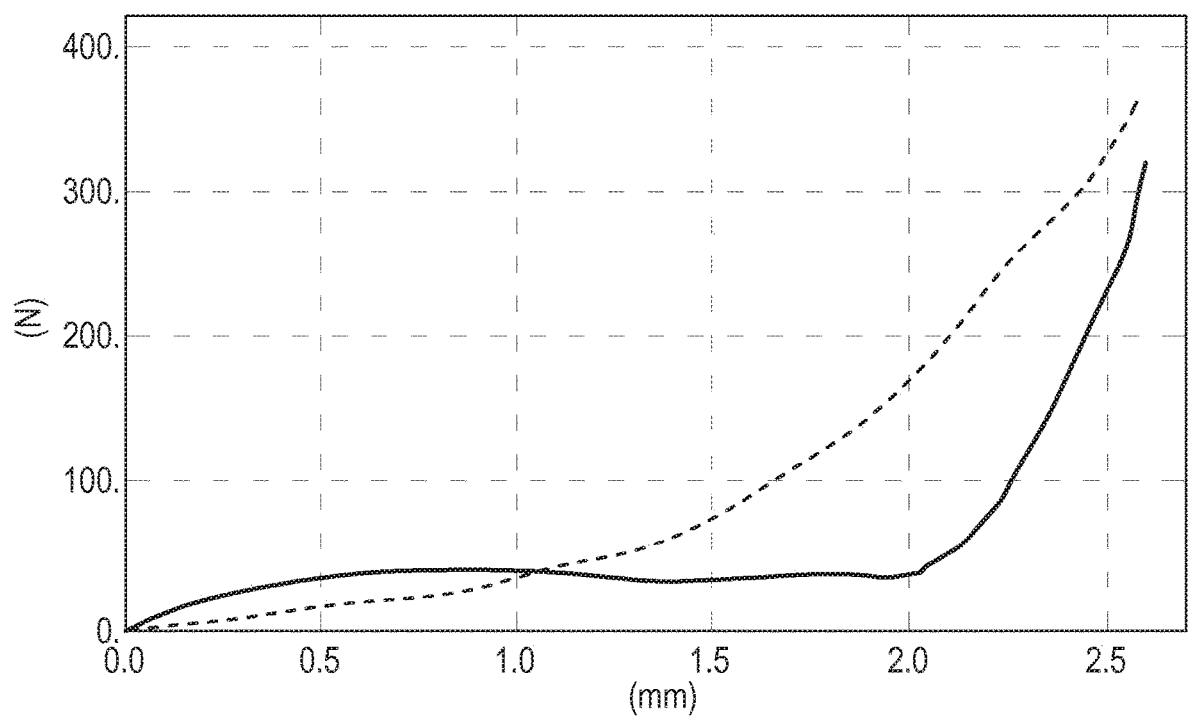
FIG. 5 shows the compression force/displacement relationship of a fastener, the profile of which is substantially as shown in FIG. 4.

FIG. 4 shows the collar 5 thickness radial profile, according to an example embodiment of the present disclosure. FIG. 5 represents the compression force/displacement relationship of a fastener 1, the profile of which is substantially as shown in FIG. 4 (solid line) and the typical relationship between the compression force and the displacement of a fastener of the state of the art.

The bending regions 6a, 6b have a lower thickness than the adjacent collar regions 7a, 7b, so the bending regions 6a, 6b have a lower stiffness than these adjacent regions. They form regions around which the collar 5 deforms in a preferred manner, by folding, because of the weight of the load.

In this embodiment, the first bending region 6a is located at the connection region, and the second bending region 6b is located on the collar 5 at mid-radius thereof, i.e., the outer region 7a and the inner region 7b form rings having approximately the same width.

The outer peripheral region 7a has a greater average thickness than the second bending region 6b. This characteristic ensures increased stiffness of the fastener at the beginning of the travel. The combination of the second bending region 6b and the relatively thick outer peripheral region 7a mainly contribute to the bending of the collar 5 at the beginning of the travel and until about mid-travel. FIG. 5 shows that the compression force is slightly greater at the beginning of the travel (for displacements of less than about 1.1 mm) in the case of the fastener according to this embodiment than in the case of a state-of-the-art fastener.

The inner region 7b may also have a higher average thickness than the first bending region 6a. The lower thickness at the first bending region 6a limits the compression force at the end of the travel. The combination of the first bending region 6a and the inner region 7b mainly participates in the bending of the collar 5 in the second part of the travel until it stops. FIG. 5 thus shows that the compression force is smaller at the end of the travel (for displacements of more than about 1.1 mm) in the case of the fastener according to this embodiment than in the case of a state-of-the-art fastener.

The first connection region 6a advantageously has a greater stiffness than the second connection region 6b. This helps to promote deformation at the second connection region at the beginning of the travel.

It can be seen that the radial thickness profile of the collar 5 of the embodiment of FIG. 4 makes it possible to obtain a compression force behavior—compression displacement forming a plateau over a large portion of the travel of the fastener.

Of course, the present disclosure is not limited to the embodiment described and represented, in particular, in FIG. 4. Alternative embodiments can be provided without departing from the scope of the present disclosure, as defined in the claims. In general, the radial thickness profile of the collar 5 will be adjusted to give the fastener 1 a desired compression force—compression displacement behavior. The skilled person will thus be assisted by simulation tools, for example, by applying a numerical finite element approximation method, to define the radial thickness profile to be given to the collar 5 to obtain a precisely expected behavior.

The invention claimed is:

1. A fastener for attaching an element to a support, the fastener comprising:
   a fastening base intended to pass through an opening provided in the support in response to application of an axial compression force to the fastener;
   a head connected to the base; and
   a frustoconical and elastically deformable compression collar configured to bear and compress against the support in response to application of the axial compression force, the compression collar connected to the head at a connection region, the compression collar including a first bending region and at least a second bending region, the first and second bending regions having a lower thickness than adjacent collar regions such that the first bending region and the at least second bending region are less rigid and deform in a predetermined manner when the fastener is subjected to the axial compression force against the support, wherein the first bending region and the second bending region each extend circumferentially around the collar, the first bending region location concentrically between the second bending region and the head.

2. The fastener of claim 1, wherein the head is disposed on top of the compression collar.

3. The fastener of claim 2, wherein the collar has an outline with a circular cross-section.

4. The fastener of claim 3, wherein the second bending region is located at mid-radius of the collar.

5. The fastener of claim 4, wherein the first bending region is located at a level of the connection region.

6. The fastener of claim 5, wherein the fastening base comprises an elastic snap-fitting mechanism.

7. The fastener of claim 6, wherein the fastening base is a snap-fitting leg comprising a plurality of flexible wings.

8. The fastener of claim 1, wherein the collar has an outline with a circular cross-section.

9. The fastener of claim 1, wherein the second bending region is located at mid-radius of the collar.

10. The fastener of claim 1, wherein the first bending region is located at a level of the connection region.

11. The fastener of claim 1, wherein the fastening base comprises an elastic snap-fitting mechanism.

12. The fastener of claim 11, wherein the fastening base is a snap-fitting leg comprising a plurality of flexible wings.

* * * * *